US007391447B2

(12) United States Patent
Lee et al.

(10) Patent No.: US 7,391,447 B2
(45) Date of Patent: Jun. 24, 2008

(54) METHOD AND APPARATUS FOR REMOVING NOISE FROM A DIGITAL IMAGE

(75) Inventors: Jong-hwan Lee, Seoul (KR); Seok-goun Lee, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 635 days.

(21) Appl. No.: 11/113,559

(22) Filed: Apr. 25, 2005

(65) Prior Publication Data

US 2006/0098107 A1     May 11, 2006

(30) Foreign Application Priority Data

Nov. 9, 2004     (KR)     ............... 10-2004-0090918

(51) Int. Cl.
*H04N 5/217*     (2006.01)
*H04N 5/225*     (2006.01)
*G06K 9/40*     (2006.01)

(52) U.S. Cl. .............. 348/241; 348/219.1; 382/262

(58) Field of Classification Search .............. 348/219.1, 348/241–250; 382/254, 260, 262, 275

See application file for complete search history.

(56) References Cited

U.S. PATENT DOCUMENTS

| | | | | | |
|---|---|---|---|---|---|
| 4,633,317 | A | * | 12/1986 | Uwira et al. | ............. 348/219.1 |
| 5,384,865 | A | * | 1/1995 | Loveridge | .................. 382/262 |
| 5,877,805 | A | * | 3/1999 | Endo | ....................... 348/218.1 |
| 6,360,025 | B1 | * | 3/2002 | Florent | ....................... 382/261 |
| 6,570,613 | B1 | * | 5/2003 | Howell | .................... 348/219.1 |
| 6,671,419 | B1 | * | 12/2003 | Martins | ...................... 382/274 |
| 7,092,017 | B2 | * | 8/2006 | Kelly et al. | ................. 348/241 |
| 7,304,670 | B1 | * | 12/2007 | Hussey et al. | ............... 348/241 |
| 2004/0169735 | A1 | * | 9/2004 | Andersen | ................. 348/219.1 |
| 2005/0073596 | A1 | * | 4/2005 | Takahashi | .................... 348/241 |
| 2006/0092297 | A1 | * | 5/2006 | Lee et al. | ..................... 348/241 |
| 2006/0188169 | A1 | * | 8/2006 | Tener et al. | ................. 382/254 |
| 2006/0290794 | A1 | * | 12/2006 | Bergman et al. | ............ 348/246 |

FOREIGN PATENT DOCUMENTS

| | | | |
|---|---|---|---|
| JP | 2003-051991 A | 2/2003 | |
| JP | 2004-023331 A | 1/2004 | |

* cited by examiner

*Primary Examiner*—Lin Ye
*Assistant Examiner*—Timothy J Henn
(74) *Attorney, Agent, or Firm*—Drinker Biddle & Reath LLP

(57) ABSTRACT

An apparatus and method of removing fixed pattern noise in a digital image processing apparatus are provided. The apparatus includes a controlling unit adjusting a number of image frames of a same image photographed by an imaging device and an exposure time of a shutter, and controlling a movement direction of the imaging device, which photographs the image; and a signal processing unit which median-combines the image frames of the same image photographed by the imaging device during the adjusted exposure time after moving the imaging device. The total photographing time is reduced by skipping a process of photographing a dark image and fixed pattern noise can be effectively removed by median-combining the image frames photographed while physically moving the imaging device between the photographing of consecutive image frames to remove the fixed pattern noise.

20 Claims, 9 Drawing Sheets

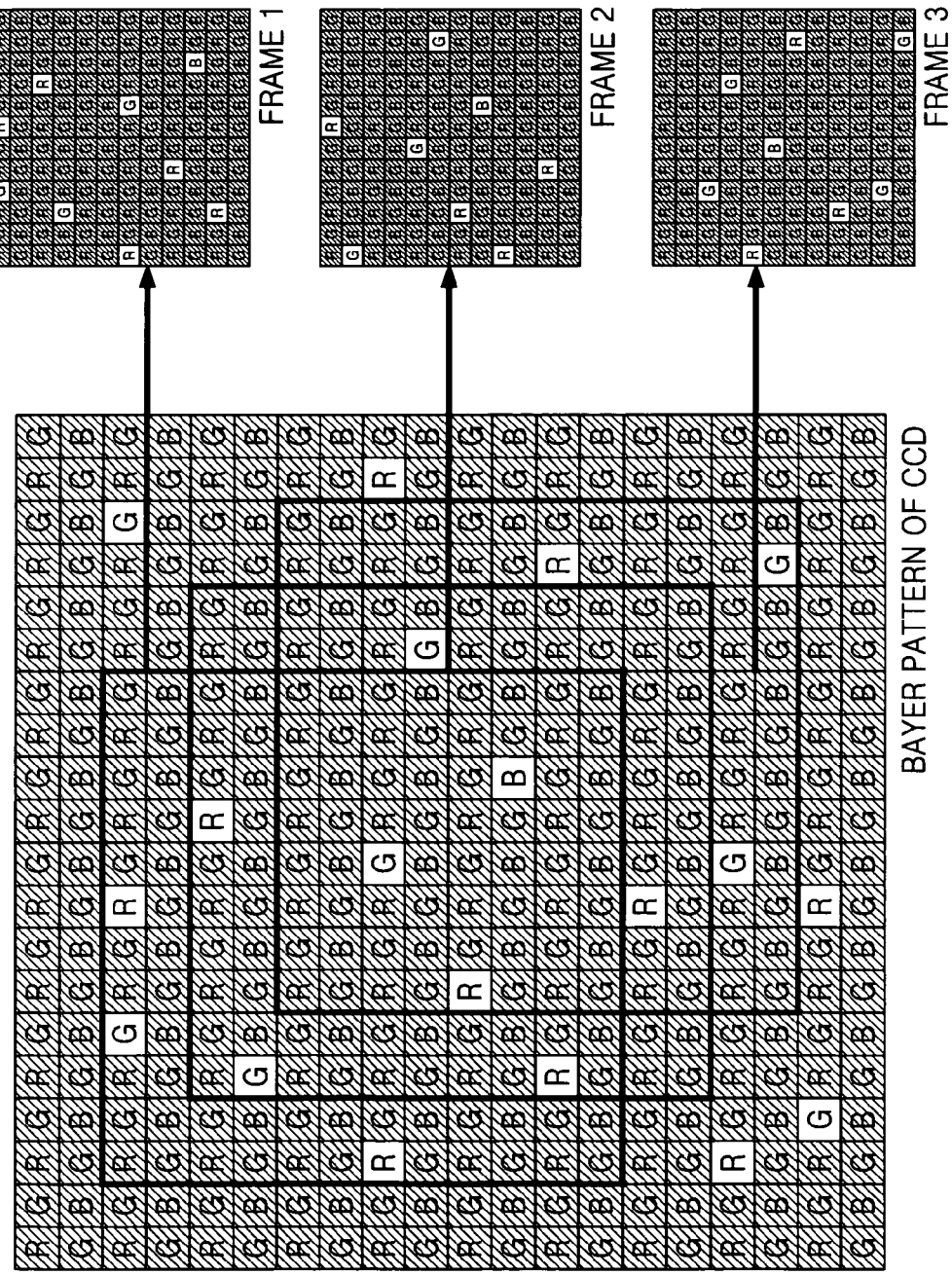

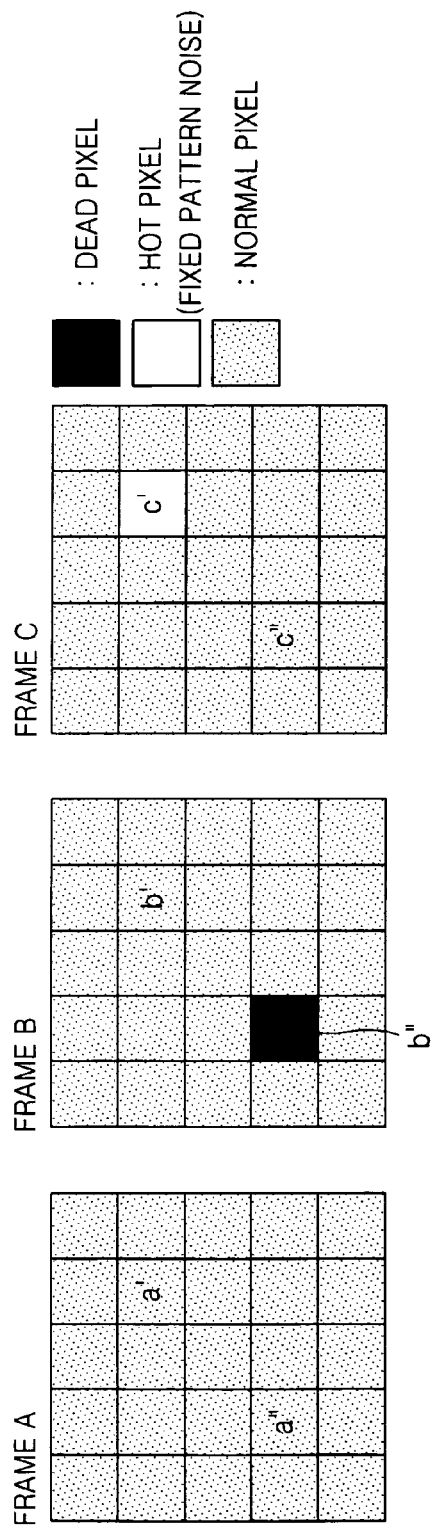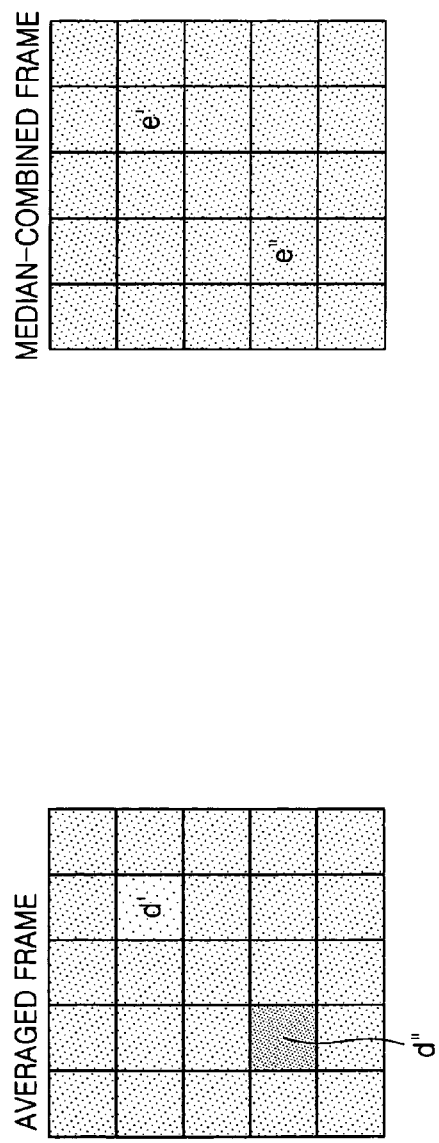

FRAME 1

FRAME 2

FRAME 3

MEDIAN-COMBINED FRAME

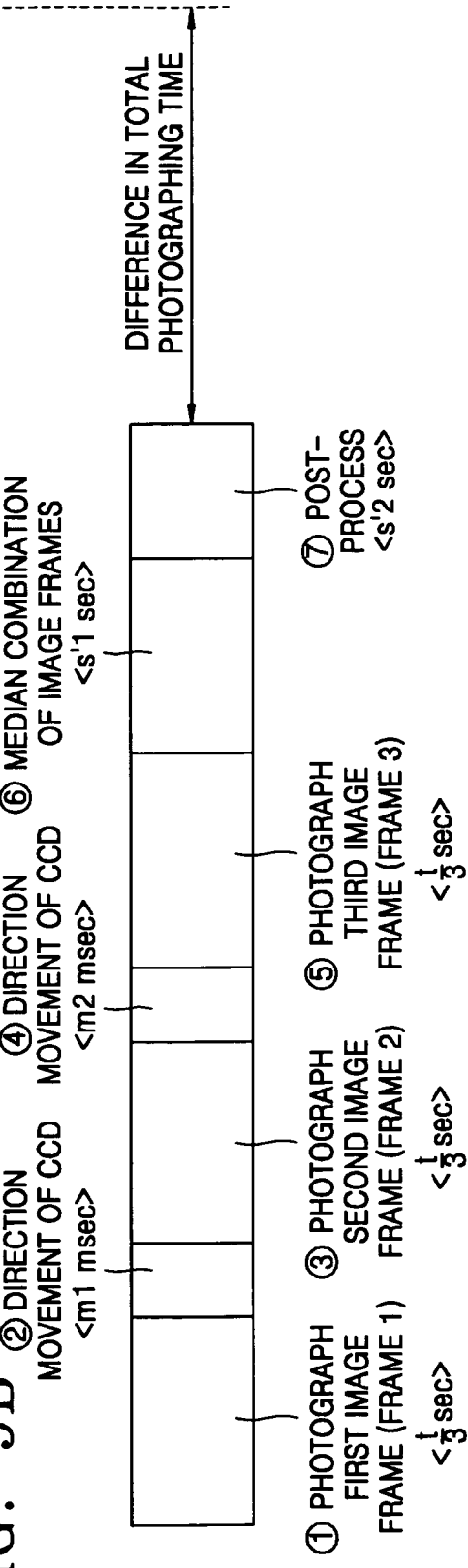

METHOD AND APPARATUS FOR REMOVING NOISE FROM A DIGITAL IMAGE

BACKGROUND OF THE INVENTION

This application claims the priority of Korean Patent Application No. 10-2004-0090918, filed on Nov. 9, 2004 in the Korean Intellectual Property Office, the disclosure of which is incorporated herein in its entirety by reference.

1. Field of the Invention

The present invention relates to methods and apparatuses for removing noise from digital images, and, more particularly, to a method and apparatus for removing hot pixels from a digital image, in which an imaging device is physically moved between successive image frame captures, and the resulting image frames are median combined.

2. Description of the Related Art

Digital imaging devices such as digital cameras and digital camcorders use charged coupled devices (CCDs) in place of film. A CCD is a sensor that converts light into electric signals. It has a silicon chip with minute photodiodes disposed on top of it. These photodiodes are organized into numerous "pixels" on top of the silicon chip in a checkered pattern. Each pixel of the CCD captures light that is eventually converted into one "pixel" of an image.

CCDs are sensitive to heat. As a result, heat noise is frequently generated when a CCD operates, which prevents a cell from accurately generating the color for its pixel. Pixels generated by CCDs as a result of this heat noise are called hot pixels. Hot pixels usually show up at a fixed location for a short period of time. That is why hot pixels are also called "fixed pattern noise." Fixed pattern noise frequently occurs when the shutter of a digital camera is open for a long period of time, and it hinders the smooth reproduction of an image.

FIG. 1 is a flow chart illustrating a conventional method of removing fixed pattern noise. First, an image frame (Frame 1) is photographed according to a set sensitivity (ISO) and exposure time (100). The image frame (Frame 1), including the fixed pattern noise, is stored in a memory (not shown) (102). Then, a so-called "dark frame" (Frame 2) is photographed using the same ISO and exposure time as the photographed image frame (Frame 1) (104). A dark frame (such as Frame 2) is an image photographed with the shutter manually closed to physically block all light from reaching the CCD. The dark frame (Frame 2) is not affected by light but does include the fixed pattern noise.

The same exposure time is used when photographing the image frame (Frame 1) and the dark frame (Frame 2), so as to accurately reproduce the fixed pattern noise of in the image frame (Frame 1) on the dark frame (Frame 2). Ideally, the same number n hot pixels will occur on both the image frame (Frame 1) and the dark frame (Frame 2).

The photographed dark frame (Frame 2) is then stored in the memory (106). Frame subtraction is then performed to remove the fixed pattern noise. That is, the dark frame (Frame 2) is subtracted from the image frame (Frame 1) (108). Through such frame subtraction, a new image frame (Frame 3) with the fixed pattern noise removed is generated. The new image frame (Frame 3) is then corrected by image processing, and an image file (e.g., JPEG) is generated (110).

The method illustrated in FIG. 1 the total photographing time is more than twice the set exposure time of the digital image processing apparatus. For example, referring to FIG. 9A (which illustrates the total photographing time of a conventional digital image processing apparatus) if the exposure time is 10 seconds, ① the image frame (Frame 1) is photographed for 10 seconds, ② the dark frame (Frame 2) is photographed for 10 seconds, ③ the noise removal after frame subtraction takes s1 seconds, and ④ the post-processing of the frame subtraction takes s2 seconds. Consequently, the total photographing time (①+②+③+④) is more than twice the exposure time, that is, more than 20 seconds.

Thus, it can be seen that there is a need for a new method and apparatus for removing noise from a digital image that avoids the foregoing problems.

SUMMARY OF THE INVENTION

In accordance with the foregoing, an apparatus for removing fixed pattern noise in a digital image processing apparatus is provided. In an embodiment of the invention, the apparatus comprises a photoelectric converter that receives light from a subject to be photographed, captures the received light a plurality of successive times, physically moves between each successive capture of the received light such that the received light impacts on a different portion of the photoelectric converter with each successive capture, and converts the plurality of successive captures of received light into electrical signals that represent a plurality of respective image frames of the subject. The apparatus further comprises a signal processing unit that receives the electrical signals, and median-combines the plurality of respective image frames to remove the fixed pattern noise.

Also described herein is a method for removing noise from a digital image. In an embodiment of the invention light is permitted to enter a housing of a digital imaging apparatus and to strike a photoelectric converter, which captures the light to create an image frame. The photoelectric converter is physically shifted within the housing while the housing itself remains relatively stationary. These steps are repeated for a number N of iterations, thereby creating a plurality of image frames. On a pixel-by-pixel basis, the median of the plurality of image frames is calculated to create a median-combined image frame.

In another embodiment of the invention, a plurality of successive photographs of a subject are taken over a preset number of iterations, and each of the plurality of successive photographs is created based on signals generated by a photosensitive device in response to the photosensitive device receiving light from a subject that enters through a lens. The plurality of successive photographs includes at least a first photograph having a first pixel, a second photograph having a second pixel, and a third photograph having a third pixel. The first, second, and third pixels are located in the same spot in terms of the horizontal axis and the vertical axis on the each of the first, second, and third photographs. According to the embodiment, the first pixel represents noise, the second pixel does not, and the third pixel does not. Between each pair of iterations, the photosensitive device is physically shifted relative to the lens. The median of at least the first pixel, the second pixel and the third pixel is taken to define a median pixel. A fourth photograph is defined that includes the median pixel at the same spot on the fourth photograph in terms of the horizontal axis and the vertical axis as the first, second, and third pixels are located on the respective first, second and third photographs.

BRIEF DESCRIPTION OF THE DRAWINGS

The above and other features and advantages of the present invention will become more apparent by describing in detail exemplary embodiments thereof with reference to the attached drawings in which:

FIG. 6 is a view illustrating first, second, and third image frames that are photographed by physically moving a charge coupled device (CCD) illustrated in FIG. 5;

FIGS. 7A through 7E illustrate an example of the median combination of multiple frames;

FIGS. 9A and 9B illustrate the total photographing times of a conventional digital image processing apparatus and the digital image processing apparatus of FIG. 2.

DETAILED DESCRIPTION OF THE INVENTION

The present invention will now be described more fully with reference to the accompanying drawings, in which embodiments of the invention are shown.

Figure 1:
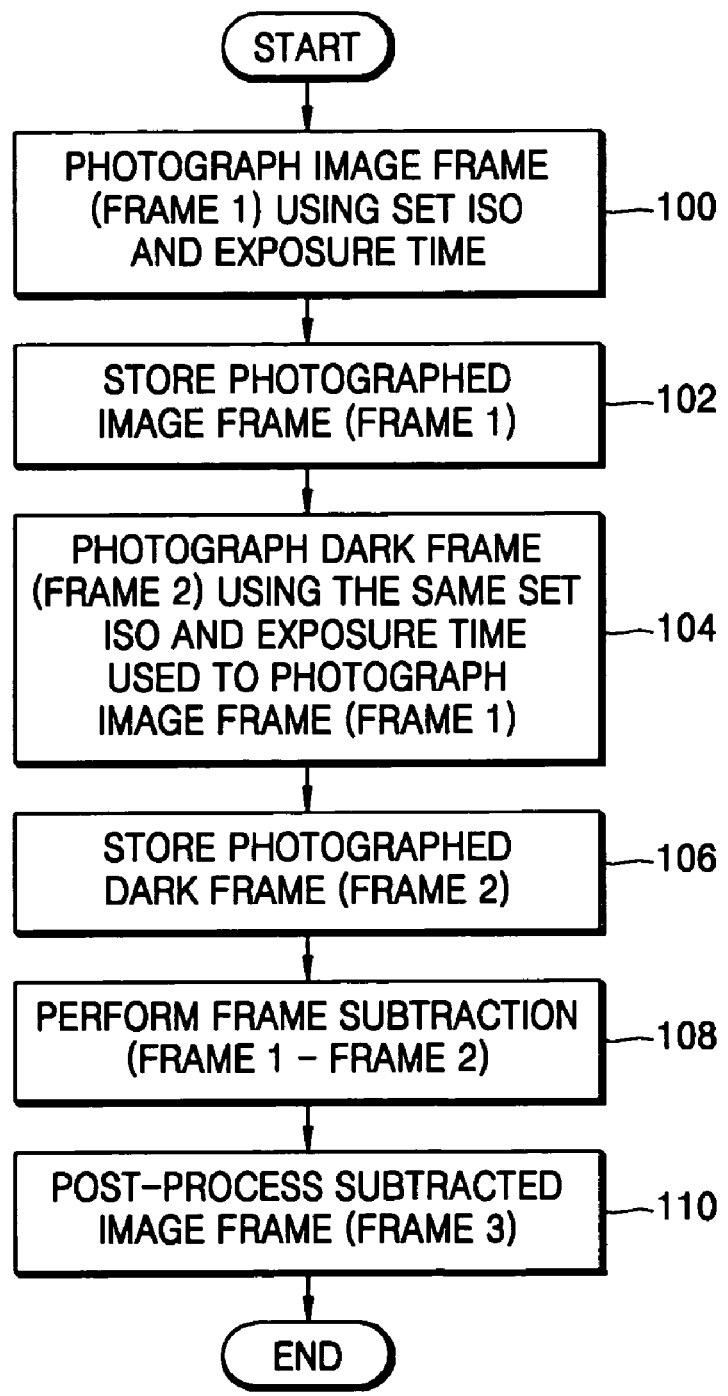
FIG. 1 is a flow chart illustrating a conventional method of removing fixed pattern noise.
Figure 2:
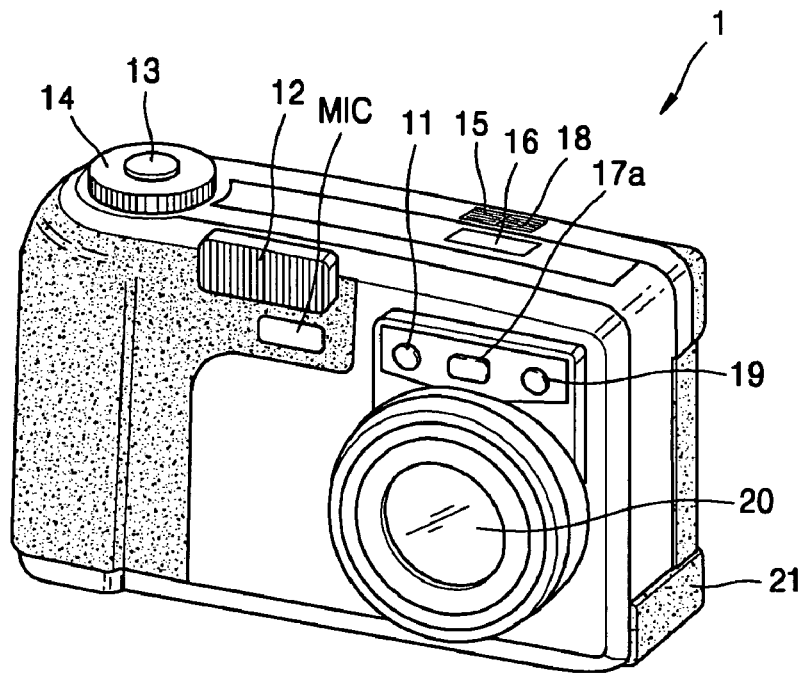
FIG. 2 is a front perspective view of a digital image processing apparatus according to an embodiment of the present invention.

Referring to FIG. 2, a digital image processing apparatus 1 includes a microphone MIC, a self-timer lamp 11, a flash 12, a view finder 17a, a flash light amount sensor (FS) 19, and a lens unit 20 on its front; a shutter 13, a mode dial 14, a function-select button 15, a photograph-information displaying unit 16, and a function-block button 18 on its top; and an external interface 21 on its side.

The self-timer lamp 11 operates from a time when the shutter 13 is pressed until the shutter 13 starts operating in a self-timer mode. The mode dial 14 is used by a user to select various operating modes, such as a still image photographing mode, a night scene photographing mode, a moving picture photographing mode, a play mode, a computer connecting mode, and a system setting mode. The function-select button 15 is used by the user to select one of, for example, a still image photographing mode, a night scene photographing mode, a moving picture photographing mode, and a play mode of the digital image processing apparatus 1.

The photograph-information displaying unit 16 displays information on each photographing function. The function-block button 18 is used by the user to select one of the functions displayed on the photograph-information displaying unit 16.

Figure 3:
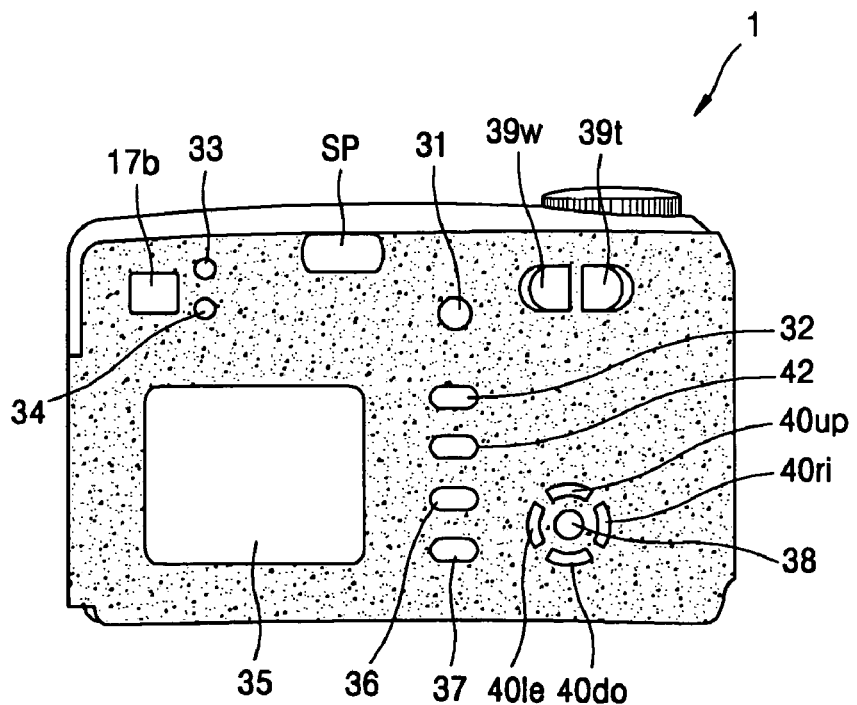
FIG. 3 is a rear view of the digital image processing apparatus of FIG. 2.

Referring to FIG. 3, the back of the digital image processing apparatus 1a includes a speaker SP, a power button 31, a monitor button 32, an automatic focus lamp 33, a view finger 17b, a flash standby lamp 34, a display panel 35 (e.g., a liquid crystal display (LCD)), an exposure compensation/delete button 36, an. enter/play button 37, a menu/OK button 38, a wide-angle zoom button 39w, a telephoto zoom button 39t, an up-movement button 40up, a right-movement button 40ri, a down-movement button 40do, a left-movement button 40le, and a playback button 42.

The monitor button 32 is used by the user to control the operation of the display panel 35. For example, if the user presses the monitor button 32 a first time, an image of a subject (i.e. the physical scene being viewed and photographed by the user) and photographing information for the image are displayed on the display panel 35, if the monitor button 32 is pressed a second time, only the image of the subject is displayed on the display panel 35, and if the monitor button 32 is pressed a third time, power supplied to the display panel 35 is cut off.

The automatic focus lamp 33 operates when an automatic focusing operation is completed. The flash standby lamp 34 operates when the flash 12 (see FIG. 2) is on standby. The exposure compensation/delete button 36 controls the amount of light when the digital image processing apparatus 1 is manually operated, or is used as a delete button when the user is setting the operating mode.

The enter/play button 37 is used by the user to input data or perform various functions, such as stop or play in the play mode. The menu/OK button 38 is used to display and select a menu of a mode selected by the mode dial 14. The up-movement button 40up, the right-movement button 40ri, the down-movement button 40do, and the left-movement button 40le are used by a user to select the modes and to change displayed region of the image displayed on the display panel 35. The playback button 42 is used to check and reproduce the last photographed image, moving picture, or audio information.

Figure 4:
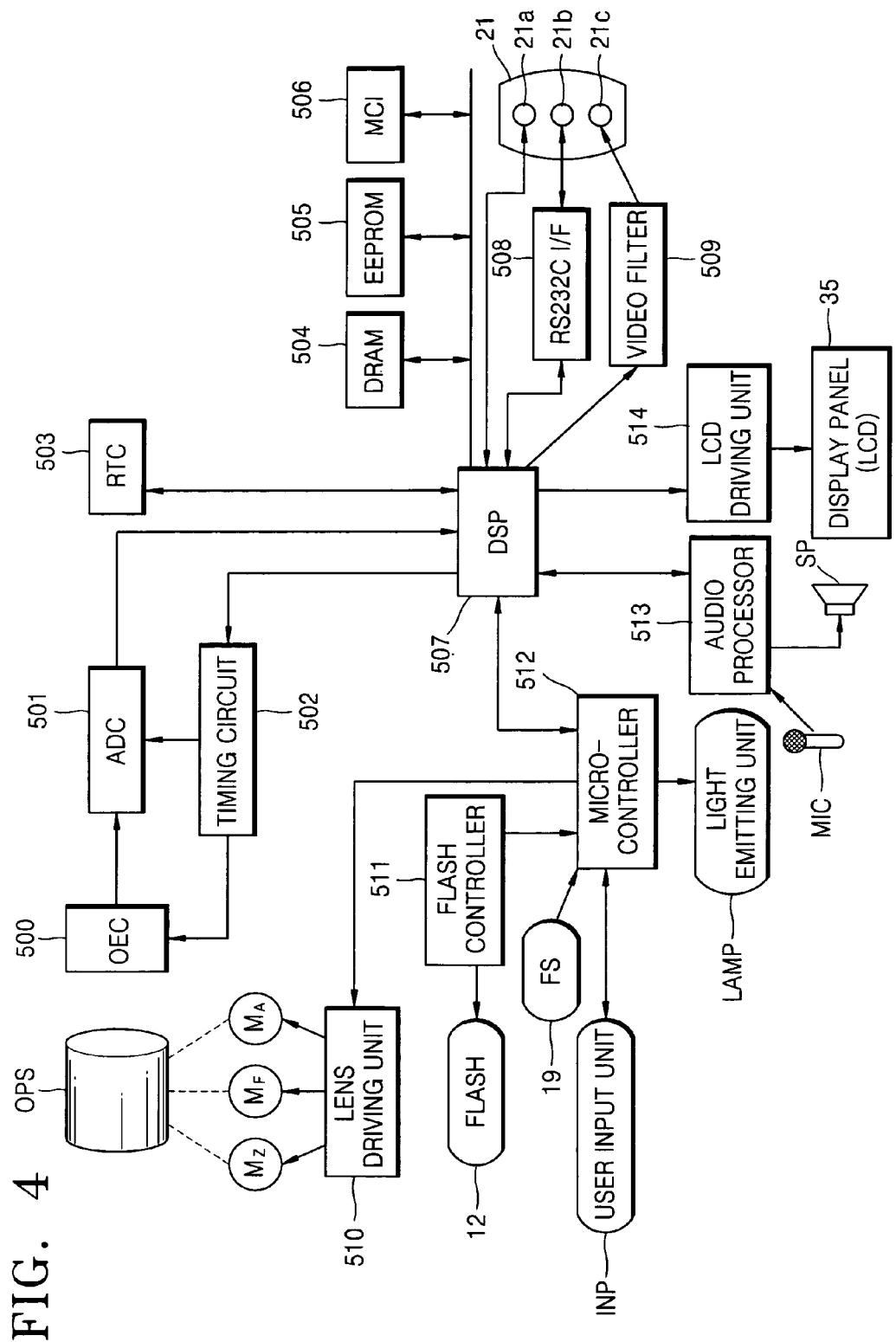
FIG. 4 is a block diagram of the digital image processing apparatus illustrated in FIGS. 2 and 3.

Referring to FIG. 4 the digital image processing apparatus 1 (from FIGS. 2 and 3) includes an optical system OPS. The optical system OPS includes the lens unit 20 from FIG. 2, and optically processes light reflected from a subject. The lens unit 20 of the optical system OPS includes a zoom lens, a focus lens, and a compensation lens (not shown).

If a user presses the wide-angle zoom button 39w (see FIG. 3) or the telephoto zoom button 39t (see FIG. 3), a signal corresponding to the wide-angle zoom button 39w or the telephoto zoom button 39t is input to a micro-controller 512. Accordingly, the micro-controller 512 controls a lens driving unit 510, which drives a zoom motor $M_z$, which, in turn, moves the zoom lens. That is, if the wide-angle zoom button 39w is pressed, the focal length of the zoom-lens is shortened, thus increasing the viewing angle. Conversely, if the telephoto zoom button 39t is pressed, the focal length of the zoom lens is lengthened, thus decreasing the viewing angle. Referential character $M_A$ denotes a motor to drive an aperture (not shown).

Referring still to FIG. 4, the digital image processing apparatus further includes a photoelectric converter (OEC) 500 of a charge coupled device (CCD) or a complementary metal oxide semiconductor (CMOS) (not shown) that converts light from the optical system OPS into electrical analog signals. In the present embodiment, the OEC 500 will often be referred to as CCD 500 as an example. It is to be understood, however, that the OEC 500 may also be implemented using CMOS.

The digital image processing apparatus further includes a digital signal processor (DSP) 507. Algorithms needed for the operation of the DSP 507 and for setting data are stored in an electrically erasable and programmable read-only memory (EEPROM) 505. The DSP 507 controls a timing circuit 502 to control the operation of the OEC 500 and an analog-to-digital converter (ADC) 501. The timing circuit 502 is controlled by the micro-controller 512. The ADC 501 converts the analog signals output from the OEC 500 into digital signals. The DSP 507 processes the digital signal from the ADC 501 and generates a digital image signal, which is divided into a chrominance signal and a luminance signal. The digital processing apparatus further includes a removable memory card coupled to a memory card interface (MCI) 506.

Referring still to FIG. 4, the digital image processing apparatus also has a light emitting unit LAMP, and a flash controller 511. The light emitting unit LAMP is operated by the micro controller 512 and includes the operate/self-timer lamp 11 (see FIG. 3), the automatic focus lamp 33 (see FIG. 3), and the flash standby lamp 34 (see FIG. 3). The flash 12 is operated via a flash controller 511 and the micro-controller 512 according to a signal from the FS 19.

The digital image processing apparatus further includes a user input unit INP. The user input INP includes the shutter 13 (see FIG. 2), the mode dial 14 (see FIG. 2), the function-select button 15 (see FIG. 2), the function-block button 18 (see FIG. 2), the monitor button 32 (see FIG. 3), the exposure compensation/delete button 36 (see FIG. 3), the enter/play button 37 (see FIG. 3), the menu/OK button 38 (see FIG. 3), the wide-angle zoom button 39w (see FIG. 3), the telephoto zoom button 39t (see FIG. 3), the up-movement button 40up (see FIG. 3), the right-movement button 40ri (see FIG. 3), the down-movement button 40do (see FIG. 3), and the left-movement button 40le (see FIG. 3).

The digital image signal output from the DSP 507 is temporarily stored in a dynamic random access memory (DRAM) 504. In an embodiment of the invention, during the noise removal procedure, a preset number of image frames of a same image are photographed by the OEC 500 and are stored in the DRAM 504. The digital image signal output from the DSP 507 is also input to an LCD driving unit 514. As a result, an image is displayed on the display panel 35, that is, a displaying unit. The digital image signal output from the DSP 507 can also be transmitted serially via a universal serial bus (USB) connector 21a or an RS232C interface 508 and its connector 21b, or can be transmitted as video signals via a video filter 509 and a video outputting unit 21c.

Referring still to FIG. 4, the digital image processing apparatus further includes an audio processor 513, which outputs an audio signal from the microphone MIC to the DSP 507 or the speaker SP, and outputs an audio signal from the DSP 507 to the speaker SP.

When a photograph is taken, light reflected from a subject enters the digital image processing apparatus 1 and strikes the CCD 500, which converts the light into electrical signals. A color filter (not shown) is generally needed to obtain a color image using the CCD 500 and most conventional CCDs include a color filter array (CFA). The CFA transmits only light of a particular color for each of the pixels of the CCD 500, which are arranged in a regular pattern. There are different types of CFA according to the arrangement pattern of the pixels of the CCD. The most commonly used pattern is the Bayer pattern illustrated in FIG. 6. The Bayer pattern has an alternating RGRG filter and GBGB filter pattern.

The CCD 500 includes an array of hundreds to thousands of pixels. Each of the pixels includes a light sensing device (such as a photodiode or photocapacitor) in which charges are accumulated by converting photons into electron-hole pairs. The number of charges that are accumulated depends on the light intensity and how long the light is illuminated. If the number of charges is calculated, the amount of light received can be converted into current.

A pixel on the CCD 500 that has a number of charges greater than a critical value is deemed to represent fixed pattern noise, and is called a hot pixel (represented in FIG. 7 by a white square) and a pixel with no charges is called a dead pixel (represented in FIG. 7 by a black square).

Figure 5:
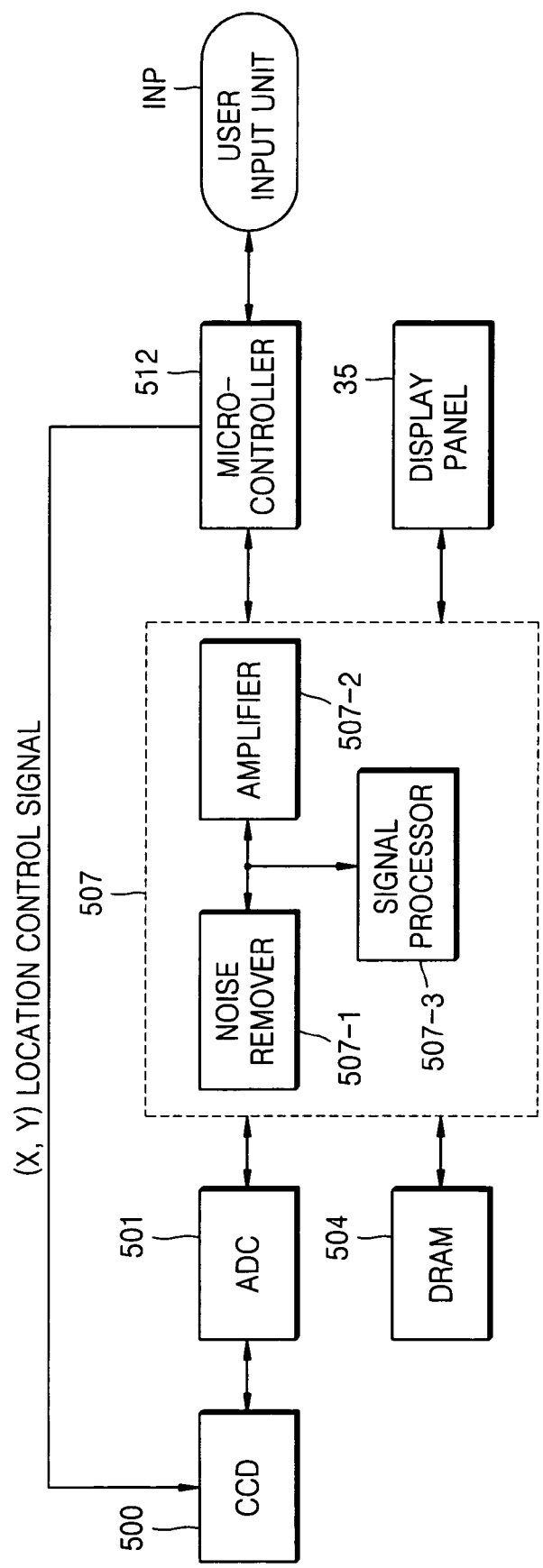
FIG. 5 is a block diagram of components used for removing fixed pattern noise in the digital image processing apparatus according to an embodiment of the present invention.

Referring to FIG. 5, those components of the digital image processing apparatus involved in noise removal according to an embodiment of the invention are shown. They will now be further described. The components include the CCD 500, the ADC 501, the DRAM 504, the DSP 507, the micro-controller 512, the user input unit INP, and the display panel 35. The DSP 507 includes a noise remover 507-1, an amplifier 507-2, and a signal processor 507-3.

The micro-controller 512 provides a menu to set ISO and an exposure time (t) of the digital image processing apparatus 1. A user sets the ISO and the exposure time of the digital image processing apparatus 1 by selecting from a menu provided via the user input unit INP to start a frame photographing operation.

The way in which noise is removed from an image according to an embodiment of the invention will now be described in the context of FIG. 5. When the frame photographing operation begins, the micro-controller 512 sets the number of image frames that will be taken by the CCD 500 of a single image. The micro-controller 512 also sets which direction the CCD 500 is to be physically moved between successive image frames. In this way, the step of photographing dark frame (described above in the Background section) is eliminated. Instead, a median combination is performed, in which pixels of several frames are averaged, thereby removing the fixed pattern noise.

The micro-controller 512 arbitrarily sets the number of image frames photographed by the CCD 500 to N. Here, N is an odd number greater than 1. In the present embodiment, it is assumed that the number of image frames photographed by the CCD 500 is set to 3, and so an image is photographed with first, second, and third image frames Frame 1, Frame 2, and Frame 3.

The micro-controller 512 sets the exposure time (t1) for photographing each of the image frames according to the following formula: (t1)=(t)/N. In this example, (t1)=(t)/3.

The micro-controller 512 outputs a control signal to physically move the CCD 500 after each photograph of single subject. Thus, when the user activates the shutter button to photograph a subject, the CCD automatically captures multiple photographic images of the subject, and is physically moved between each image, even though the body of the digital image processing apparatus 1, that is, the OPS, remains stationary. Thus, images with the same viewing angle of a single subject are photographed using multiple regions of the CCD 500. Therefore, the location of the fixed pattern noise changes when several image frames of a subject are photographed.

The number of times M that the micro-controller 512 moves the CCD 500 is computed according to the following formula: M=N−1, where N, as discussed above, is the number of image frames of a subject that is photographed by the CCD 500. In this example, M=3−1=2. Thus, the micro-controller 512 will move the CCD 500 twice—once after the first frame, and once after the second frame. In addition, the micro-controller 512 moves the CCD 500 by a multiple of 2 (±2n) pixels in the x-/y-directions when photographing the second and third image frames Frame 2 and Frame 3 to maintain the Bayer pattern of the input image constant.

Referring to FIG. 6, the first, second, and third image frames Frame 1, Frame 2, and Frame 3 are shown. These image frames are photographed by physically moving the CCD 500 as described above. The second and third frames Frame 2 and Frame 3 are photographed after moving the CCD 500 in both the x- and y-directions by 2 (±2n) pixels to maintain the Bayer pattern of the input image constant.

The first, second, and third image frames Frame 1, Frame 2, and Frame 3 are photographed using the CCD 500 (FIG. 5), converted into digital signals by the ADC 501, and stored in the DRAM 504. The first image frame Frame 1, which is the first image frame to be photographed, is photographed for the adjusted exposure time of t1, which is (t)/3, and is stored in the DRAM 504. Then, after moving the CCD 500 in the x-/y-directions by a multiple of 2 (±2n) pixels from the location of the CCD 500 when photographing the first image frame Frame 1, the second image frame Frame 2 is photographed for the adjusted exposure time of (t1) and is stored in the DRAM 504. Then, after moving the CCD 500 in the x-/y-directions by a multiple of 2 (±2n) pixels from the location of the CCD 500 when photographing the second image frame Frame 2, the third image frame Frame 3 is photographed for the adjusted exposure time of (t/1) and is stored in the DRAM 504.

Referring again to FIG. 5, the DSP 507 median-combines the first, second, and third image frames Frame 1, Frame 2, and Frame 3 that are stored in the DRAM 504 to remove the fixed pattern noise and signal process them. The noise remover 507-1 calculates a median pixel value for each location using the first, second, third image frames Frame 1, Frame 2, and Frame 3 and substitutes the calculated median values for the original pixel values of the same location to remove the fixed pattern noise.

A further explanation of how the frames are median-combined will now be given with reference to FIGS. 7A through 7E. In the median combination, pixel values at the same location in each of the photographed frames are read and a median pixel value each location is calculated. Then, the median pixel value is set as pixel value corresponding to the same location. For example, if a pixel a' FIG. 7A, which has a normal pixel value, a pixel b' of FIG. 7B, which has a normal pixel value, and a pixel c' of FIG. 7C, which has a fixed pattern value, are averaged, the fixed pattern noise is not removed and a pixel d' shown in FIG. 7D is obtained. Similarly, if a pixel a" of FIG. 7A, which has a normal pixel value, a pixel b" of FIG. 7B, which is a dead pixel, and a pixel c" of FIG. 7C, which has a normal pixel value, are averaged, the effect of the dead pixel is not removed, and a pixel d" shown in FIG. 7D is obtained. However, if the median of pixels a', b', and c' is taken, and the median of pixels a", b", and c" is taken, pixels e' and e" shown in FIGS. 7E are obtained, and, thus, the fixed pattern noise c' and the dead pixel b" are removed.

Figure 8A:
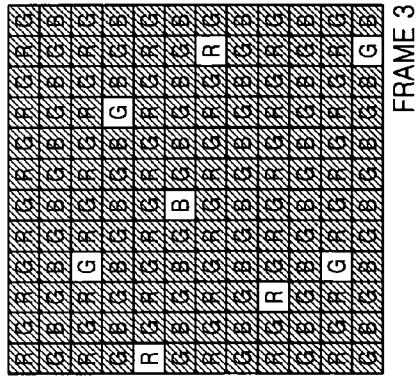
FIGS. 8A through 8D illustrate an example of the median combination of the first, second, and third image frames photographed in FIG. 6.
Figure 8B:
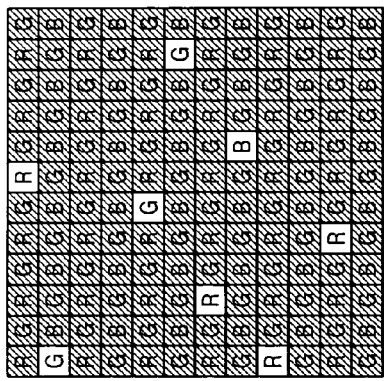
Figure 8C:
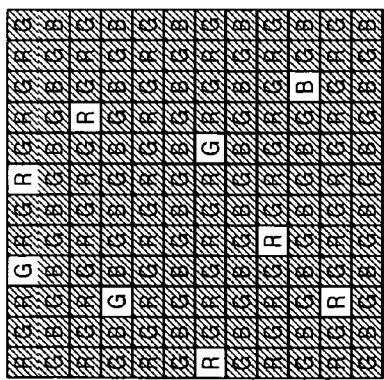
Figure 8D:
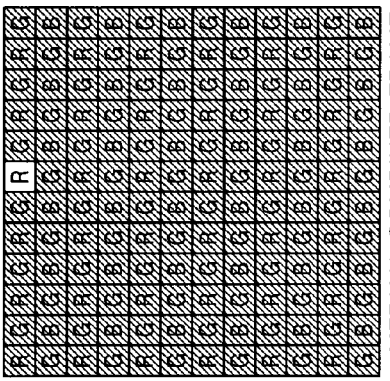

As discussed in conjunction with FIG. 6, the first, second, and third image frames Frame 1, Frame 2, and Frame 3 of the same image are formed on physically different regions of the CCD 500. Therefore, the locations of the fixed pattern noise are different in the first, second, and third image frames Frame 1, Frame 2, and Frame 3. As a result, if the median combination is applied to the first, second, and third image frames Frame 1, Frame 2, and Frame 3, not only is the fixed pattern noise removed but also dead pixels are effectively removed. This will now be illustrated with reference to FIGS. 8A through 8D. When the median combination steps explained in FIGS. 7A through 7E are performed on the first, second, and third image frames Frame 1, Frame 2, and Frame 3 of FIGS. 8A through 8C, a new fourth image frame, illustrated in FIG. 8D is obtained. As can be seen, the fourth image frame is a median-combined frame with the fixed pattern noise removed.

Referring back to FIG. 5, the amplifier 507-2 amplifies the pixel values of the fourth frame, which is the median-combined frame (FIG. 8D), by a multiple of N. Recall that N is the number of image frames photographed by the CCD 500. In this example, N=3. Since the fourth frame is the image frames photographed for the adjusted exposure time (i.e., (t)/3 or t1), the pixel values of the fourth frame are ⅓ the pixel values of a frame photographed for the unadjusted previous exposure time (i.e., t). Therefore, to make the pixel values of the fourth frame equivalent to the pixel values obtained when photographing a general image, the pixel values of the fourth frame are amplified by a factor equal to the number of image frames photographed by the CCD 500 (i.e., 3 in this example). The amplified fourth frame is then sent to the signal processor 507-3. The signal processor 507-3 processes the amplified fourth frame and stores the fourth frame in another region of the DRAM 504 or displays the fourth frame on the display panel 35.

Referring to FIGS. 9A and 9B, a comparison will now be made between a conventional digital image processing apparatus and a digital image processing apparatus configured according to an embodiment of the present invention (such as the apparatus described in conjunction with FIGS. 4 and 5). In a conventional method of removing fixed pattern noise using frame subtraction, the total photographing time is more than double the set exposure time of a digital image processing apparatus. Thus, the photographing time increases. For example, referring to FIG. 9A, if an exposure time of 15 seconds is applied to a conventional digital image processing apparatus, ① an image frame (Frame 1) is photographed for 15 seconds, ② a dark frame (Frame 2) is photographed for 15 seconds, ③ noise is removed for s1 seconds, and ④ post-processing is performed for s2 seconds. Consequently, the total photographing time (①+②+③+④) is more than double the exposure time, that is, 30 seconds plus the processing time s1 and s2.

However, in an embodiment of the present invention, the step of photographing the dark frame is omitted and N image frames of the subject are photographed by the CCD 500, each for the adjusted exposure time t/N, thereby reducing the total photographing time. For example, referring to FIG. 9B, if the total exposure time is 15 seconds and 3 image frames of the subject are photographed by the CCD 500, ① the first image frame Frame 1 is photographed for 5 seconds (15/3 seconds), ② the CCD 500 moves for m1 seconds, ③ the second image frame Frame 2 is photographed for 5 seconds (15/3 seconds), ④ the CCD 500 moves for m2 seconds, ⑤ the third image frame Frame 3 is photographed for 5 seconds (15/3 seconds), ⑥ the first through third image frames Frame 1 through Frame 3 are median combined, which takes s'1 seconds, and ⑦ the median combination is post-processed for s'2 seconds. Consequently, the total photographing time (①+②+③+④+⑤+⑥+⑦processing time, which is notably less than the total photographing time required by the conventional digital image processing apparatus.

Figure 10:
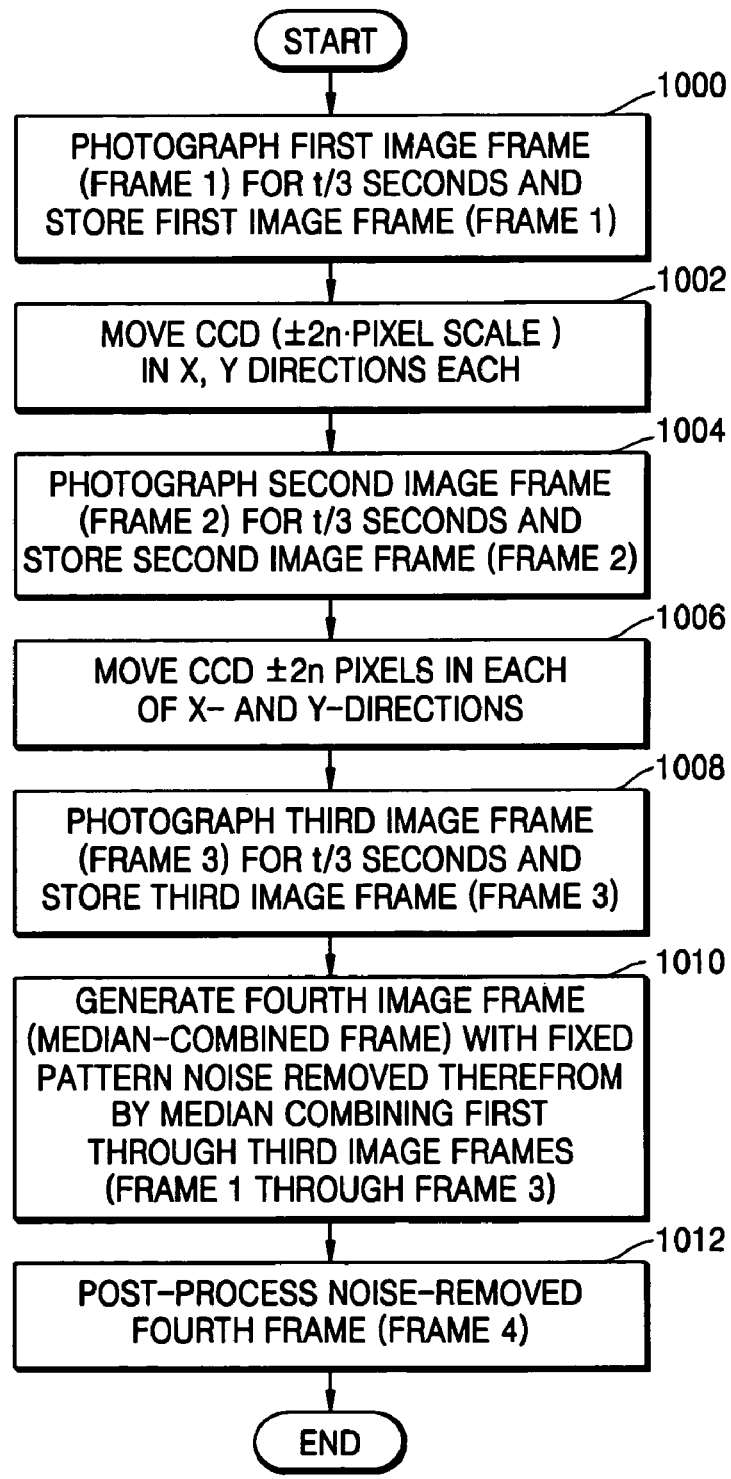
FIG. 10 is a flow chart illustrating a method of removing fixed pattern noise in a digital image processing apparatus according to an embodiment of the present invention.

Referring to FIG. 10, a flow chart illustrating a method of removing the fixed pattern noise in the digital image processing apparatus 1 according to an embodiment of the present invention will now be described with appropriate references to FIGS. 4 and 5. When ISO and exposure time of the digital image processing apparatus 1 is set by a user and the digital image processing apparatus 1 enters a photographing mode, the micro-controller 512 sets the number of image frames of a subject photographed by the CCD 500 and adjusts the exposure time based on the number of image frames to be photographed by the CCD 500. Also, the micro-controller 512 sets the direction in which the CCD 500 is to physically move whenever the image frames that constitute the image are photographed so that the median combination can be performed to remove the fixed pattern noise.

The micro-controller 512 arbitrarily sets the N image frames to be photographed by the CCD 500 (N is an odd number greater than 1, e.g., 3) and sets the exposure time for each image frame to the total exposure time (t)/N of image frames and moves the CCD 500 by a multiple of 2 (±2n (pixel scale)) in each of the x- and y-directions.

A first image frame (Frame 1) is photographed for the exposure time (t/3) and is stored in the DRAM 504 (1000). After storing the first image frame (Frame 1), the microcontroller 512 outputs a direction movement control signal to the CCD 500 to move the CCD 500 (1002). The microcontroller 512 moves the CCD 500 by the multiple of 2 (±2n (pixel scale)) pixels in both the x- and y-directions, for example, (⊿x, ⊿y)=(+2×pixels, −2×pixels) from the location where the first image frame (Frame 1) was photographed. The time required to move the CCD 500 is very short, and may be as few as tens to hundreds of milliseconds.

After the CCD 500 is moved, a second image frame (Frame 2) is photographed for the exposure time (t/3) and is stored in the DRAM 504 (1004). As illustrated in FIG. 6, when comparing the first and second image frames Frame 1 and Frame 2, it can be seen that the location of the fixed pattern noise in the second image frame (Frame 2) is different than the location of the fixed pattern noise in the first image frame (Frame 1).

After the second image frame Fame 2 is stored, the microcontroller 512 outputs a direction movement control signal to the CCD 500 to move the CCD 500 (1006). The microcontroller 512 moves the CCD 500 by the multiple of 2 (±2n (pixel scale)) pixels in both the x- and y-directions, for example, (⊿x, ⊿y)=(+2×pixels, −2×pixels) from the location where the second image frame (Frame 2) was photographed.

After the CCD 500 is moved, a third image frame (Frame 3) is photographed for the exposure time (t/3) and is stored in the DRAM 504 (1008). As illustrated in FIG. 6, when comparing the second and third image frames Frame 2 and Frame 3, it can be seen that the location of the fixed pattern noise in the third image frame (Frame 2) is different than the location of the fixed pattern noise in the second image frame (Frame 2).

The DSP 507 median-combines the first, second, and third image frames Frame 1, Frame 2, and Frame 3 to generate a fourth image frame, which is a median-combined frame, with the fixed pattern noise removed (1010). The noise remover 507-1 calculates a median pixel value for each location using the first, second, and third image frames Frame 1, Frame 2, and Frame 3 and then, replaces the pixel values corresponding to the same locations with the calculated median value to remove the fixed pattern noise. The first, second, and third image frames Frame 1, Frame 2, and Frame 3 are formed on different regions of the CCD 500, and therefore, the fixed pattern is formed on different locations of the first, second, and third image frames Frame 1, Frame 2, and Frame 3. Therefore, if the median combination is applied to the first, second, and third image frames Frame 1, Frame 2, and Frame 3, not only is the fixed pattern noise removed but also dead pixels are effectively removed.

Since the median-combined frame with the noise removed is a combination of the first, second, and third image frames Frame 1, Frame 2, and Frame 3, each photographed for the adjusted exposure time (t/3), the pixel values of the median-combined frame is ⅓ the pixel values of frames photographed using the previous exposure time (t). Therefore, the amplifier 507-2 amplifies the pixel values of the median-combined frame with the noise removed by N image frames photographed by the CCD 500, that is, 3. Then, image processing is performed on the amplified median-combined frame and is either stored in another region of the DRAM 504 or displayed on the display panel 35 (1012).

As described above, the present invention does not require the photographing of a dark image and median combines image frames photographed by physically moving a photoelectric converter to remove fixed pattern noise when photographing an image. Thus, total photographing time is reduced while the fixed pattern noise is reduced, as illustrated in FIG. 9B.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for removing fixed pattern noise in a digital image processing apparatus, the apparatus comprising:
   a photoelectric converter that performs steps comprising:
      receiving light from a subject to be photographed,
      capturing the received light a plurality of successive times,
      physically moving between each successive capture of the received light such that the received light impacts on a different portion of the photoelectric converter with each successive capture, and
      converting the plurality of successive captures of received light into electrical signals that represent a plurality of respective image frames of the subject; and
   a signal processing unit that performs steps comprising:
      receiving the electrical signals, and
      median-combining the plurality of respective image frames to remove the fixed pattern noise.

2. The apparatus of claim 1, further comprising a controlling unit that performs steps comprising setting the number of successive captures to be made by the imaging device to an odd number greater than 1.

3. The apparatus of claim 1, further comprising a controlling unit that performs steps comprising setting the exposure time for each successive capture based at least in part on the number of successive captures to be made by the imaging device.

4. The apparatus of claim 1, further comprising a controlling unit that performs steps comprising setting the distance that the imaging device physically moves to an even number of pixels.

5. The apparatus of claim 4, wherein the signal processing unit comprises:
   a noise remover that calculates a median pixel value for each pixel at the same location in each of the respective image frames and generates a new image frame in which the pixel values are the calculated median pixel values;
   an amplifier that amplifies the pixel values of the new image frame by a value equal to the number of successive times the received light was captured by the imaging device; and
   a signal processor that processes the new image frame so that the pixel values are amplified to be displayable.

6. The apparatus of claim 1, wherein the photoelectric converter is a charge-coupled device.

7. The apparatus of claim 1, wherein the photoelectric converter is a complimentary metal-oxide semiconductor device.

8. The apparatus of claim 1, wherein the digital image processing apparatus is a digital camera.

9. The apparatus of claim 8, further comprising:
a display screen;
a lens; and
a shutter,
wherein, the light from the subject enters the lens, the shutter opens in response to a user's input to enable the photoelectric converter to receive the light, and the signal processing processes the median-combined image to enable the median-combined image to be displayed to the user on the display screen.

10. A method for removing noise from a digital image, the method comprising:
(a) permitting light to enter a housing of a digital imaging apparatus and to strike a photoelectric converter;
(b) capturing the light with the photoelectric converter to create an image frame;
(c) physically shifting the photoelectric converter within the housing while the housing itself remains relatively stationary;
(d) repeating steps (b) and (c) for a number N of iterations, thereby creating a plurality of image frames; and
(e) on a pixel-by-pixel basis, calculating the median of the plurality of image frames to create a median-combined image frame.

11. The method of claim 10, wherein the digital imaging apparatus comprises a shutter that, when closed, prevents the light from entering the housing, the method further comprising keeping the shutter constantly open during steps (a), (b), (c), and (d).

12. The method of claim 10, further comprising displaying an image that is based on the median-combined frame on a display screen.

13. The method of claim 10, further comprising compressing the median-combined image frame and stored the compressed median-combined image frame as a file in a memory.

14. The method of claim 10, wherein, prior to step (a) being performed,
a shutter of the digital imaging apparatus is closed, thereby preventing light from entering the housing, and
in response to a user initiated action, the shutter opens, thereby allowing light to enter the housing.

15. A method for removing noise from an image on a digital image processing apparatus, the digital image processing apparatus comprising a photosensitive device and a lens, the method comprising:
taking a plurality of successive photographs of a subject over a preset number of iterations,
wherein each of the plurality of successive photographs is created based on signals generated by the photosensitive device in response to the photosensitive device receiving light from the subject that enters through the lens,
wherein the plurality of successive photographs includes at least a first photograph having a first pixel, a second photograph having a second pixel, and a third photograph having a third pixel,
wherein the first, second, and third pixels are located in the same spot in terms of the horizontal axis and the vertical axis on the each of the first, second, and third photographs,
wherein the first pixel represents noise, the second pixel does not, and the third pixel does not;
between each pair of iterations, physically shifting the photosensitive device relative to the lens;
taking the median of at least the first pixel, the second pixel and the third pixel to define a median pixel; and
creating a fourth photograph that includes the median pixel at the same spot on the fourth photograph in terms of the horizontal axis and the vertical axis as the first, second, and third pixels are located on the respective first, second and third photographs.

16. The method of claim 15, wherein the preset number of iterations is an odd number greater than 1.

17. The method of claim 15, wherein each of the successive photographs is taken using an adjusted exposure time that is equal to the total exposure time set for the camera divided by the number of iterations.

18. The method of claim 15,
wherein the photsensitive device is moved a number of times,
wherein the number is equal to the number of iterations minus 1, and
wherein the imaging device is moved a multiple of 2 pixels each time.

19. The method of claim 15, further comprising displaying the fourth photograph on a display screen.

20. The method of claim 15, wherein,
a shutter of the digital imaging apparatus is closed, thereby preventing light from reaching the photosensitive device, and
in response to a user initiated action, the shutter opens, thereby allowing light to reach the photosensitive device.

* * * * *